(12) United States Patent
Zhou et al.

(10) Patent No.: US 11,543,017 B2
(45) Date of Patent: Jan. 3, 2023

(54) SOUND REDUCTION ASSEMBLY, A RING CONFIGURED TO ATTENUATE SOUND AND A METHOD

(71) Applicant: GM GLOBAL TECHNOLOGY OPERATIONS LLC, Detroit, MI (US)

(72) Inventors: Sen J. Zhou, Troy, MI (US); John Miller, Howell, MI (US); Martin G. Foulkes, Howell, MI (US); Jeffrey D. Curtis, South Lyon, MI (US); Jack M. Gayney, Grosse Ile, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 110 days.

(21) Appl. No.: 17/141,594

(22) Filed: Jan. 5, 2021

(65) Prior Publication Data
US 2022/0213955 A1 Jul. 7, 2022

(51) Int. Cl.
*F16H 57/028* (2012.01)
*F16H 57/021* (2012.01)

(52) U.S. Cl.
CPC ......... *F16H 57/028* (2013.01); *F16H 57/021* (2013.01)

(58) Field of Classification Search
CPC .............................. F16H 57/028; F16H 57/021
See application file for complete search history.

(56) References Cited

U.S. PATENT DOCUMENTS

| 5,125,289 A | * | 6/1992 | Heidrich | F16H 57/0006 74/606 R |
| 5,345,839 A | * | 9/1994 | Nett | B60K 17/00 74/606 R |
| 2008/0258569 A1 | * | 10/2008 | Kano | B60K 6/445 310/51 |
| 2010/0292043 A1 | * | 11/2010 | Tao | F16H 57/028 475/344 |
| 2015/0082940 A1 | * | 3/2015 | Tarver | F16H 57/028 74/606 R |
| 2018/0106356 A1 | * | 4/2018 | Mizoguchi | F16H 48/40 |
| 2022/0145980 A1 | * | 5/2022 | Oda | F16H 57/021 |
| 2022/0170541 A1 | * | 6/2022 | Mueller | F16H 57/028 |

* cited by examiner

*Primary Examiner* — David M Fenstermacher
(74) *Attorney, Agent, or Firm* — Quinn IP Law (57) ABSTRACT

A sound reduction assembly includes a housing and a component supported via the housing. The component is movable relative to the housing. The sound reduction assembly includes a ring coupled to the component and the housing. The ring is configured to attenuate sound inducing vibrations in response to operation of the component. The ring includes a flange fixed relative to the housing to maintain a position of the ring relative to the component which maximizes attenuation of the sound in response to operation of the component. A method of utilizing a ring to attenuate sound inducing vibrations in response to operation of a component inside of a housing. A torque is selected to be applied to the ring. A stiffness of the ring is determined based on a stiffness-torque curve utilizing the selected torque to maximize attenuation of the sound. The ring is manufactured to meet the determined stiffness.

19 Claims, 4 Drawing Sheets

SOUND REDUCTION ASSEMBLY, A RING CONFIGURED TO ATTENUATE SOUND AND A METHOD

INTRODUCTION

Vehicles include many components that are rotatable during operation. These rotating components may produce noise during operation. This noise may be heard by an occupant of the vehicle.

SUMMARY

The present disclosure provides a sound reduction assembly that includes a housing and a component supported via the housing. The component is movable relative to the housing. The sound reduction assembly also includes a ring coupled to the component and the housing. The ring is configured to attenuate sound inducing vibrations in response to operation of the component. The ring includes a flange fixed relative to the housing to maintain a position of the ring relative to the component which maximizes attenuation of the sound in response to operation of the component.

In certain aspects, the ring includes a body that extends to a first distal edge and a second distal edge that oppose each other. Generally, the flange protrudes from one of the first distal edge and the second distal edge.

In various aspects, the component is rotatable about a central axis. For example, the component is rotatable about the central axis which creates a high-load area on the component. In certain configurations, the flange maintains the position of the body of the ring along the high-load area to maximize attenuation of the sound in response to operation of the component.

In certain aspects, the ring surrounds the central axis. In various configurations, the body of the ring extends axially relative to the central axis. In certain configurations, the flange is disposed transverse to one of the first distal edge and the second distal edge. For example, the flange is disposed transverse to the first distal edge and extends toward the central axis such that part of the flange overlaps part of the component. In other configurations, the flange is disposed axially from one of the first distal edge and the second distal edge relative to the central axis.

In various configurations, the body of the ring includes a plurality of first corrugations disposed between the first distal edge and the second distal edge, and the flange includes a second corrugation.

In yet further aspects, the housing defines a hole along the central axis. In certain configurations, the component includes a bearing disposed in the hole, and the ring is disposed radially between the bearing and the housing relative to the central axis.

In various configurations, the bearing includes a first race fixed to the housing and a second race rotatable relative to the first race about the central axis. In certain configurations, the body of the ring is disposed between the first race and the housing.

Furthermore, in further aspects, the housing defines a recess that connects to the hole such that the recess is open to the hole and faces the central axis. In various configurations, the body of the ring is disposed in the recess.

According to further aspects, the housing defines a path that connects to the recess and the flange is disposed in the path to fix the position of the body of the ring relative to the housing and the first race. In certain configurations, the path extends axially relative to the central axis, and the flange extends axially relative to one of the first distal edge and the second distal edge into the path. In other configurations, the path extends both axially and radially relative to the central axis, and the flange extends both axially and radially from one of the first distal edge and the second distal edge into the path.

According to further aspects, the component includes a shaft and the bearing that supports rotation of the shaft and rotation of the shaft creates the high-load area on the bearing. Generally, the body of the ring is positioned along the high-load area to maximize attenuation of the sound in response to operation of the shaft.

In certain configurations, the body of the ring includes a first end and a second end spaced from each other to define an opening therebetween such that the body of the ring is non-contiguous. For example, the opening is spaced from the high-load area.

In various configurations, the body of the ring includes a first portion that provides a first-ring stiffness and a second portion that provides a second-ring stiffness different from the first-ring stiffness. In these configurations, rotation of the shaft creates a first-high-load area on the bearing when in a first condition and creates a second-high-load area on the bearing when in a second condition. Generally, the first-high-load area is different from the second-high-load area. In these configurations, the first portion of the body that has the first-ring stiffness aligns with the first-high-load area to maximize attenuation of the sound in the first-high-load area and the second portion of the body that has the second-ring stiffness aligns with the second-high-load area to maximize attenuation of the sound in the second-high-load area.

According to another aspect, the flange is further defined as a plurality of flanges spaced from each other, and each of the flanges protrude from one of the first distal edge and the second distal edge. In certain configurations, each of the flanges are fixed relative to the housing to maintain a position of the body relative to the housing.

The present disclosure also provides a ring coupled to a component and a housing. The ring is configured to attenuate sound inducing vibrations in response to operation of the component. The ring includes a body that extends to a first distal edge and a second distal edge that oppose each other. The ring includes a flange that protrudes outwardly from one of the first distal edge and the second distal edge. The body of the ring includes a plurality of first corrugations disposed between the first distal edge and the second distal edge. The flange includes a second corrugation. The flange is fixed relative to the housing to maintain a position of the body of the ring relative to the component.

The present disclosure provides a method of utilizing a ring to attenuate sound inducing vibrations in response to operation of a component inside of a housing. A torque is selected to be applied to the ring. A stiffness of the ring is determined based on a stiffness-torque curve utilizing the selected torque to maximize attenuation of the sound in response to operation of the component. The ring is manufactured to meet the determined stiffness. A profile of the component is manufactured at a torque range higher than the selected torque applied to the ring. The ring is disposed radially between the component and the housing to attenuate the sound in response to operation of the component.

The detailed description and the drawings or FIGS. are supportive and descriptive of the disclosure, but the claim scope of the disclosure is defined solely by the claims. While some of the best modes and other configurations for carrying out the claims have been described in detail, various alternative designs and configurations exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims.

Figure 1:
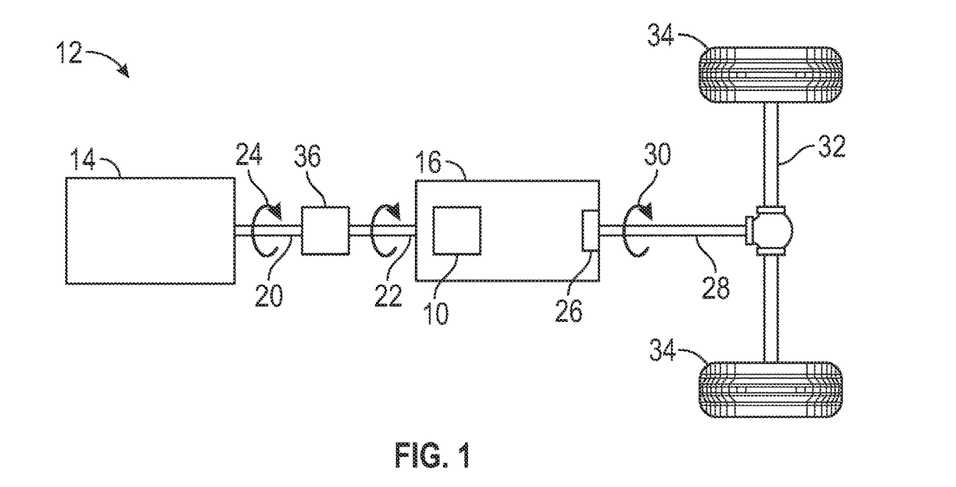
FIG. 1 is a schematic illustration of a movable platform, as one example, to implement a sound reduction assembly.

Referring to the FIGS., wherein like numerals indicate like or corresponding parts throughout the several views, a sound reduction assembly 10 is generally shown in FIG. 1 in an example implementation of the sound reduction assembly 10. Generally, the sound reduction assembly 10 may be used to attenuate sound that is produced or generated via moving parts, which will be discussed further below. That is, for example, the sound reduction assembly 10 may be used to attenuate sound inducing vibrations produced or generated via moving parts.

Specifically, as shown in FIG. 1, the sound reduction assembly 10 may be used in a movable platform 12. Non-limiting examples of the movable platform 12 may include a vehicle, a car, a truck, a motorcycle, an off-road vehicle, a farm vehicle, a watercraft, an aircraft, a rail vehicle, or any other suitable movable platform 12. Additionally, the vehicle may be a diesel/gas-powered vehicle, a hybrid vehicle, an electric vehicle, etc. It is to be appreciated that alternatively, the sound reduction assembly 10 may be used in a non-vehicle application, such as, farm equipment, stationary platforms, stationary or mobile power plants, robots, conveyors, transport platforms, hard drives, air conditioning units, etc. For illustrative purposes, the movable platform 12 of FIG. 1 will be described hereinafter in the context of a vehicle without limiting the present teachings to vehicle applications in general.

Continuing with FIG. 1, the vehicle may include a prime mover 14 and a transmission 16 coupled to the prime mover 14. Generally, the prime mover 14 creates power to propel the vehicle, and the transmission 16 provides directional control of the vehicle (such as drive, reverse, park) and also may provide speed and torque conversion of the power from the prime mover 14. The prime mover 14 may be any suitable configuration to create power to propel the vehicle. For example, non-limiting examples of the prime mover 14 may include one or more of an engine, an internal combustion engine, an electric machine, an electric motor, an electric traction motor, etc.

Generally, the transmission 16 is coupled to the prime mover 14 to receive torque outputted from the prime mover 14. The transmission 16 and the prime mover 14 may each include a housing 18, with the respective housings 18 of the transmission 16 and the prime mover 14 being rigidly attached to each other. The prime mover 14 may include an output shaft 20, and the transmission 16 may include an input member 22. The output shaft 20 of the prime mover 14 rotates at an engine speed (see arrow 24), and torque from rotation of the output shaft 20 is transferred to the input member 22 of the transmission 16, which causes the input member 22 to rotate. Non-limiting examples of the transmission 16 may include automatic transmission, dual clutch transmission, automated manual transmission, continuously variable transmission (CVT), etc.

Again continuing with FIG. 1, the transmission 16 may include a final drive 26 coupled to the input member 22 and an output member 28 that delivers output torque (see arrow 30) to one or more drive axles 32 through the final drive 26, and ultimately to a set of wheels 34. Therefore, torque from the prime mover 14 is transferred to the transmission 16, and the transmission 16 outputs torque to drive the wheels 34. It is to be appreciated that the final drive 26 may be driven by an endless rotatable member, and non-limiting examples of the endless rotatable member may include a belt or a chain.

Optionally, the vehicle may include a torque converter 36 (see FIG. 1) operable between the output shaft 20 and the input member 22. For example, the torque converter 36 may be connected to the output shaft 20 of the prime mover 14 and the input member 22 of the transmission 16. As such, the output shaft 20 of the prime mover 14 is rotatable to transfer torque in a direction to the input member 22 of the transmission 16 through the torque converter 36. Therefore, the torque converter 36 may provide the desired multiplication of torque from the prime mover 14 into the transmission 16 at low speeds.

Generally, the sound reduction assembly 10 may be used to attenuate sound due to sound produced or generated via the moving parts of, for example, the prime mover 14, the transmission 16, a differential, etc. That is, for example, the sound reduction assembly 10 may be used to attenuate sound inducing vibrations produced or generated via moving parts of, for example, the prime mover 14, the transmission 16, the differential, etc. The moving parts may generate noise during operation and this noise may be radiated out to other parts, which may be referred to as structure-borne noise. For example, this noise may be radiated outside of the prime mover 14, the transmission 16, the differential, etc., which may then be heard via an occupant of the vehicle, and thus, it is desirable to attenuate this noise. Therefore, the sound reduction assembly 10 is designed to attenuate the sound, such as the noise, generated during operation of the moving parts. The sound reduction assembly 10 may use impedance mismatch to reduce the sound heard due to the sound produced or generated via the moving parts. For example, the moving parts may vibrate at one or more frequencies to produce sound that radiates out to other locations. Impedance mismatch is where the sound reduction assembly 10 counters the one or more frequencies produced via the moving parts which reduces the sound heard outside of the housing 18 of the moving parts. The impedance mismatch allows the vibration of the moving parts to pass through a ring 44 of the sound reduction assembly 10. The ring 44 reduces in force and amplitude the sound that is transmitted to the housing 18 (as compared to the sound that would be transmitted to the housing 18 without using the ring 44). This sound reduction is achieved by being at a higher level of structural compliance than either of the housing 18 or the vibration of the moving parts. This impedance mismatch provides a degree of isolation between the moving parts and the housing 18.

Figure 2:
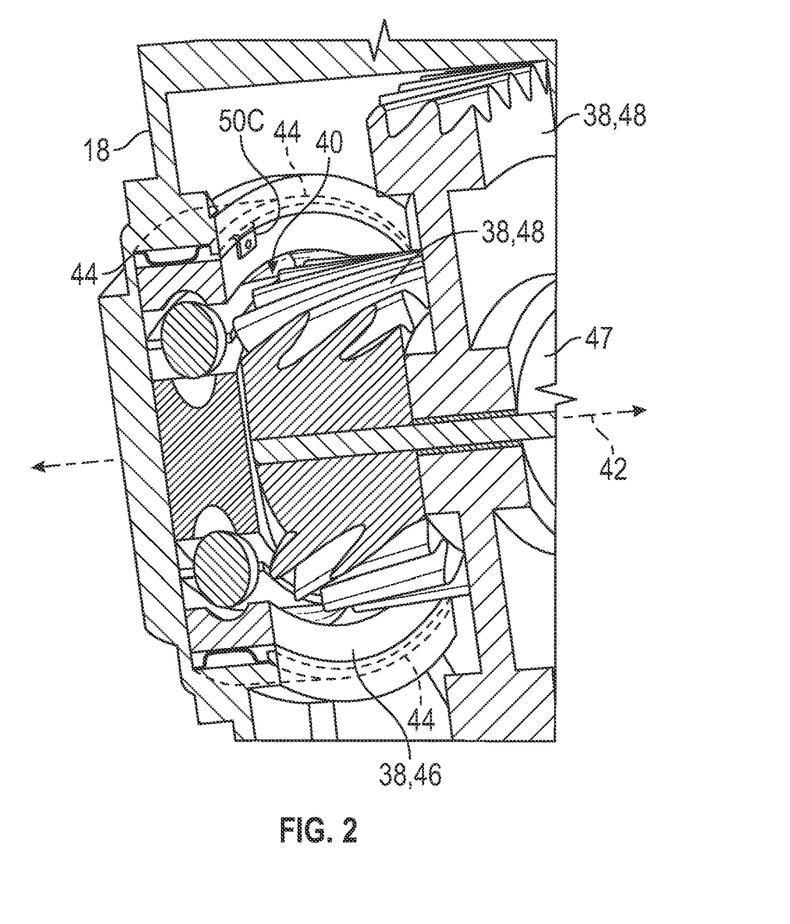
FIG. 2 is a schematic fragmentary cross-sectional view of a transmission, as one example, utilizing the sound reduction assembly.
Figure 7:
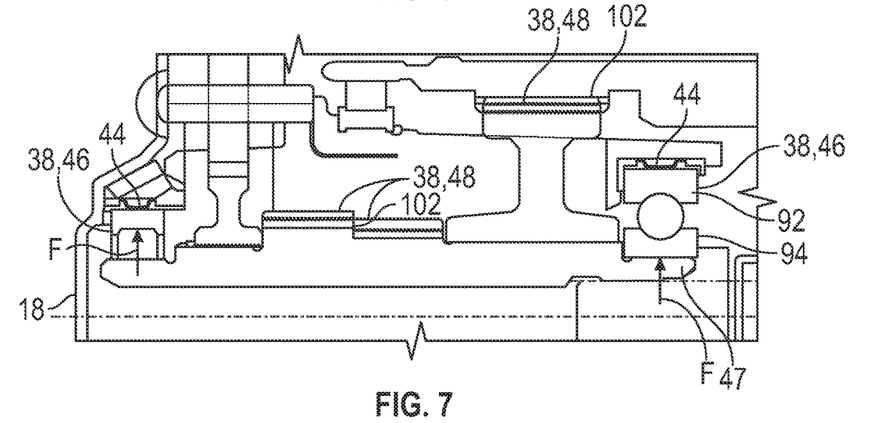
FIG. 7 is a schematic fragmentary cross-sectional view of the ring relative to a bearing.

Referring to FIGS. 2 and 7, the sound reduction assembly 10 includes the housing 18 and a component 38 supported via the housing 18. The housing 18 may contain various moving parts, some of which may be the component 38. For example, the housing 18 may contain the moving parts (including the component 38) of the prime mover 14, the transmission 16, the differential, etc. As such, the housing 18 may be a transmission casing, an engine casing, an electric machine casing, a differential casing, etc. In certain configurations, as best shown in FIG. 1, the housing 18 may define a hole 40 along a central axis 42; and depending on the location of the hole 40 and the type of the housing 18, the output shaft 20, the input member 22, or the output member 28, etc., may be disposed through the hole 40.

The component 38 is movable relative to the housing 18. In certain configurations, the component 38 is rotatable about the central axis 42. In certain configurations, the component 38 is rotatable about the central axis 42 which creates a high-load area $HL$, $HL_1$, $HL_2$ (see FIGS. 10 and 11) on the component 38. For example, torque Ts (see FIG. 9) may be created via rotation of the component 38, and this torque Ts creates the high-load area $HL$, $HL_1$, $HL_2$ which produce vibrations, and ultimately the sound that the ring 44 (discussed further below) is designed to counter. That is, operation of the component 38 produces or generates vibrations that create the sound, such as the noise, that may be heard outside of the housing 18. It is desirable to attenuate this sound. The component 38 may be various configurations, and non-limiting examples of the component 38 may include one or more of bearing(s) 46, shaft(s) 47 including the output shaft 20, gear(s) 48, member(s) including the input member 22 and the output member 28, etc. It is to be appreciated that the component 38 may include one or more of the moving parts.

As best shown in FIGS. 2-5, the ring 44 may be disposed between certain parts to attenuate the sound in response to operation of the moving parts, and thus, reduce the noise heard outside of the housing 18. Therefore, the sound reduction assembly 10 also includes the ring 44 coupled to the component 38 and the housing 18. Generally, the ring 44 is configured to attenuate the sound in response to operation of the component 38. As such, movement of the component 38 may produce or generate vibrations which create one or more frequencies that radiate through the housing 18, and the ring 44 is designed to counter one or more of these frequencies to attenuate sound that radiates outside of the housing 18. Hence, the ring 44 may be used to create the impedance mismatch.

In certain configurations, the ring 44 is disposed radially between the component 38 and the housing 18 relative to the central axis 42. Therefore, the sound that radiates radially from the moving component 38 will be attenuated via the ring 44 due to the ring 44 being positioned radial to the component 38. That is, the ring 44 surrounds (outside) the component 38 relative to the central axis 42.

Referring to FIGS. 2-5 and 8, the ring 44 includes a flange 50A, 50B, 50C fixed relative to the housing 18 to maintain a position of the ring 44 relative to the component 38 which maximizes attenuation of the sound in response to operation of the component 38. Therefore, for example, the features of the ring 44, which are discussed further below, are located in a certain position relative to the component 38 to maximize attenuation of the sound along the high-load area $HL$, $HL_1$, $HL_2$ of the component 38.

Figure 3:
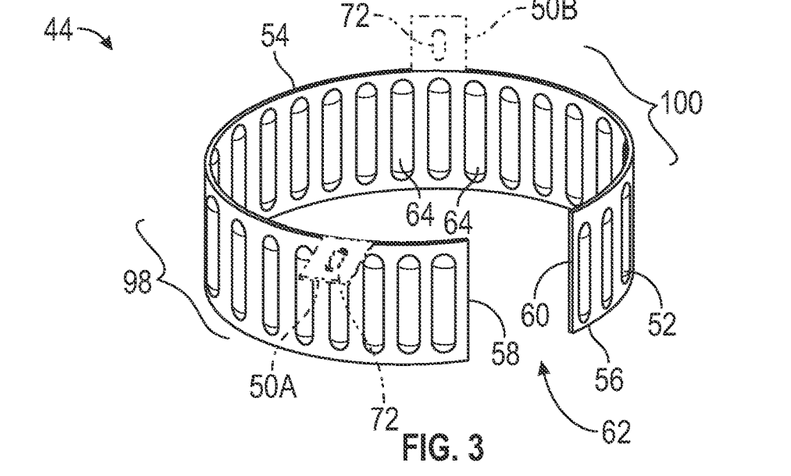
FIG. 3 is a schematic perspective view of a ring illustrating two different optional orientations of a flange in phantom lines, and also illustrating the option of utilizing a plurality of flanges.
Figure 4:
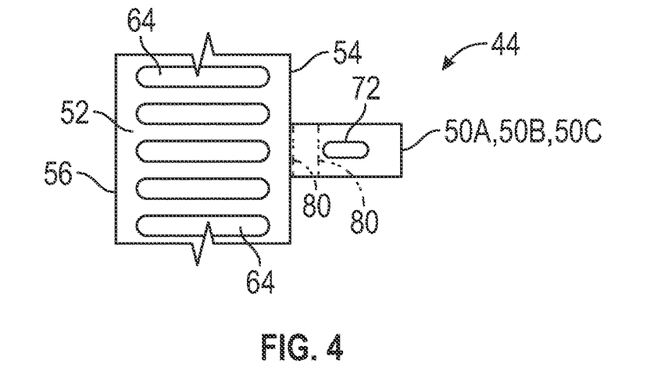
FIG. 4 is a schematic fragmentary side view of the ring illustrating two different optional folding locations of the flange in phantom lines.
Figure 5:
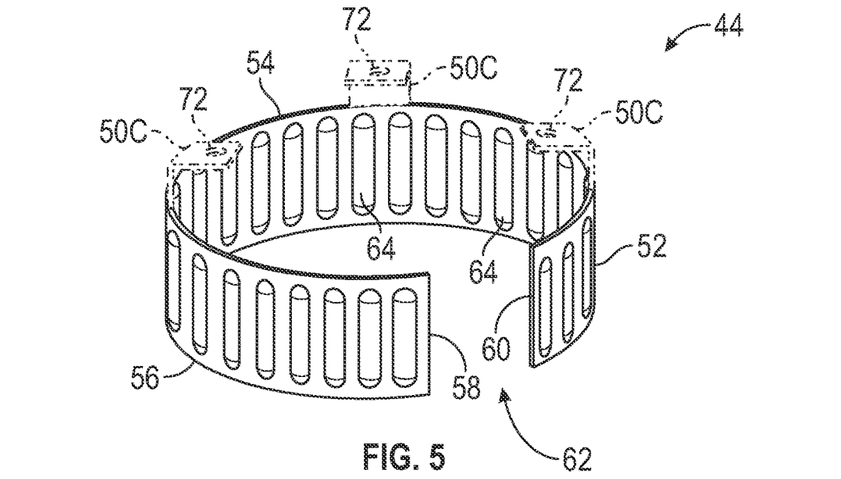
FIG. 5 is a schematic perspective view of the ring illustrating another optional orientation of the flange in phantom lines, and also illustrating the option of utilizing the plurality of flanges.

As best shown in FIGS. 3-5, the ring 44 may include a body 52 that extends to a first distal edge 54 and a second distal edge 56 that oppose each other. Generally, the body 52 is configured to attenuate the sound radially relative to the central axis 42. Furthermore, the body 52 from the first distal edge 54 to the second distal edge 56 is characterized by the absence of any holes, apertures, etc., to prevent the sound from escaping through the ring 44 via such holes, apertures, etc. The flange 50A, 50B, 50C maintains the position of the body 52 of the ring 44 along the high-load area $HL$, $HL_1$, $HL_2$ to maximize attenuation of the sound in response to operation of the component 38.

As best shown in FIGS. 3 and 5, the body 52 of the ring 44 may include a first end 58 and a second end 60 spaced from each other to define an opening 62 therebetween such that the body 52 of the ring 44 is non-contiguous. Furthermore, the body 52 from the first end 58 to the second end 60 is characterized by the absence of any holes, apertures, etc., to prevent the sound from escaping through the ring 44 via such holes, apertures, etc. The opening 62 of the ring 44 may allow the ring 44 to be compressed during assembly of the ring 44 to the housing 18. In addition, the opening 62 of the ring 44 creates a location having no body 52, and thus a location where attenuation of the sound is not reduced or not attenuated. Therefore, due to the ring 44 having this opening 62, it is desirable to fix the position of the ring 44 along the high-load area $HL$, $HL_1$, $HL_2$ of the component 38 to maximize attenuation of the sound produced or generated during operation of the component 38, which will be discussed further below.

As best shown in FIGS. 3-5, the body 52 of the ring 44 may include a plurality of first corrugations 64 disposed between the first distal edge 54 and the second distal edge 56. In addition, the first corrugations 64 may be disposed around the body 52 between the first end 58 and the second end 60. The first corrugations 64 protrude outwardly and/or inwardly relative to the body 52. Furthermore, the first corrugations 64 are closed. That is, the first corrugations 64 are characterized by the absence of any holes, apertures, etc., to prevent the sound from escaping through the ring 44 via such holes, apertures, etc.

Figure 8:
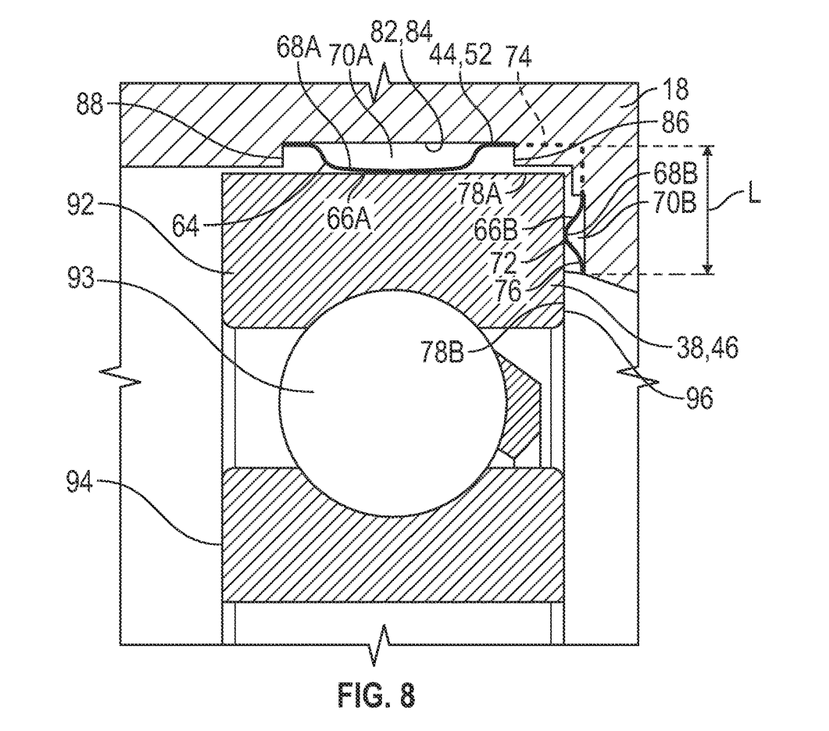
FIG. 8 is a schematic fragmentary cross-sectional view of the ring disposed between a housing and the bearing.

As best shown in FIG. 8, a first side 66A of the first corrugations 64 abut the housing 18 or the component 38 and a second side 68A of the first corrugations 64 are spaced from the other one of the housing 18 or the component 38. For example, in one configuration as shown in FIG. 8, the first side 66A of the first corrugations 64 abuts the component 38 and the second side 68A of the first corrugations 64 are spaced from the housing 18 to present a pocket 70A. Furthermore, the first corrugations 64 allow the body 52 to be elastically compressed when one or more forces is/are applied to the body 52 in response to operation of the component 38. The first corrugations 64 are configured in a desired configuration and desired spacing apart from each other to present the body 52 having desired stiffness characteristics which is discussed further below. The first corrugations 64 along the body 52 may also function to control the location of the ring 44 relative to the housing 18 with acceptable positional tolerance.

The flange 50A, 50B, 50C is fixed relative to the housing 18 to maintain a position of the body 52 of the ring 44 relative to the component 38. Generally, as best shown in FIGS. 3-5, the flange 50A, 50B, 50C protrudes from one of the first distal edge 54 and the second distal edge 56. More specifically, the flange 50A, 50B, 50C may protrude outwardly from one of the first distal edge 54 and the second distal edge 56. In one configuration, the flange 50A, 50B, 50C protrudes from the first distal edge 54. In another configuration, the flange 50A, 50B, 50C protrudes from the second distal edge 56.

Continuing with FIGS. 3-5, in certain configurations, the flange 50A, 50B, 50C may include a second corrugation 72. Depending on the size of the flange 50A, 50B, 50C, one or more of the second corrugations 72 may be disposed along the flange 50A, 50B, 50C. The second corrugations 72 protrude outwardly and/or inwardly relative to the flange 50A, 50B, 50C. Furthermore, the second corrugations 72 are closed. That is, the second corrugations 72 are characterized by the absence of any holes, apertures, etc., to prevent the sound from escaping through the flange 50A, 50B, 50C via such holes, apertures, etc.

As best shown in FIG. 8, a first side 66B of the second corrugation(s) 72 abut the housing 18 or the component 38 and a second side 68B of the second corrugation(s) 72 is spaced from the other one of the housing 18 or the component 38. For example, in one configuration as shown in FIG. 8, the first side 66B of the second corrugation 72 abuts the component 38 and the second side 68B of the second corrugation 72 is spaced from the housing 18 to present a pocket 70B. In the configuration as best shown in FIG. 8, the flange 50C is bent around a corner of the component 38 to present a radial portion 74 of the flange 50C and an axial portion 76 of the flange 50C. Therefore, the flange 50C along the axial portion 76 is configured to attenuate the sound of the moving component 38 axially along the axial portion 76. The second corrugations 72 may also prevent direct contact of an axial face of the bearing 46 with the housing 18 which eliminates a vibration path through axial contact.

Generally, the ring 44 surrounds the central axis 42, and in certain configurations, the body 52 of the ring 44 extends axially relative to the central axis 42 (see FIG. 2). The flange 50A, 50B, 50C may be disposed in various orientations relative to the body 52, and FIGS. 3 and 5 illustrates different orientations of the flange 50A, 50B, 50C in phantom lines (dash-dot-dot-dash lines). Referring to FIG. 3, in certain configurations, the flange 50A may be disposed transverse to one of the first distal edge 54 and the second distal edge 56. In other configurations, continuing with FIG. 3, the flange 50B may be disposed axially from one of the first distal edge 54 and the second distal edge 56 relative to the central axis 42. In yet other configurations, as shown in FIG. 5, the flange 50C may be disposed both axially and radially from one of the first distal edge 54 and the second distal edge 56 relative to the central axis 42. With regards to the configuration of FIG. 5, the flange 50C may be disposed transverse to the first distal edge 54 and extends toward the central axis 42 such that part of the flange 50C overlaps part of the component 38, i.e., the radial portion 74 overlaps one side 78A of the component 38, and the axial portion 76 overlaps another side 78B of the component 38 (see FIG. 8). FIG. 4 illustrates different folding locations or points 80 in phantom lines (dash-dot-dot-dash lines) along the flange 50A, 50B, 50C to represent example locations to fold the flange 50A, 50B, 50C to create the transverse portions relative to one of the first distal edge 54 and the second distal edge 56.

In certain configurations, the ring 44 may include one flange 50A, 50B, 50C in any one of the orientations discussed immediately above (also see FIGS. 3 and 5). In other configurations, more than one flange 50A, 50B, 50C may be disposed around the ring 44. Therefore, optionally, the flange 50A, 50B, 50C may be further defined as a plurality of flanges 50A, 50B, 50C spaced from each other. Each of the flanges 50A, 50B, 50C may protrude from one of the first distal edge 54 and the second distal edge 56. Each of the flanges 50A, 50B, 50C may be fixed relative to the housing 18 to maintain a position of the body 52 relative to the housing 18. Each of the plurality of flanges 50A, 50B, 50C may be configured as discussed above for the single flange 50A, 50B, 50C. The plurality of flanges 50A, 50B, 50C are shown in phantom lines (dash-dot-dot-dash lines) to represent the optional feature of using the plurality of flanges 50A, 50B, 50C.

Figure 6:
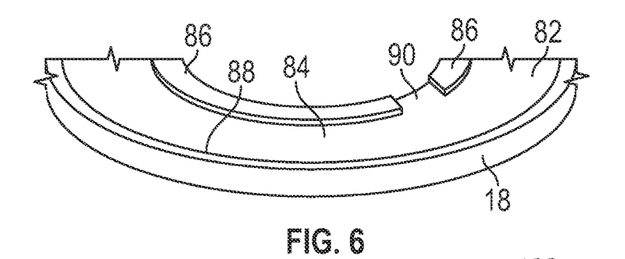
FIG. 6 is a schematic fragmentary perspective side view of a housing defining a recess and a path.

As best shown in FIGS. 6 and 8, the housing 18 may define a recess 82 that connects to the hole 40 such that the recess 82 is open to the hole 40 and faces the central axis 42. The body 52 of the ring 44 may be disposed in the recess 82, and the side 78A of the component 38 faces the recess 82. As such, the housing 18 may present a back wall 84, a first shoulder 86 and a second shoulder 88 spaced from each other to surround the recess 82 along three-sides (see FIG. 6). The first distal edge 54 of the body 52 may face the first shoulder 86 and the second distal edge 56 of the body 52 may face the second shoulder 88.

Furthermore, the housing 18 may define a path 90 (see FIG. 6) that connects to the recess 82, and the flange 50A, 50B, 50C is disposed in the path 90 to fix the position of the body 52 of the ring 44 relative to the housing 18 and the bearing 46, such as a first race 92 of the bearing 46 in certain configurations. More specifically, the path 90 may be defined through the first shoulder 86 of the housing 18. In certain configurations, the path 90 may extend axially relative to the central axis 42, and the flange 50B may extend axially relative to one of the first distal edge 54 and the second distal edge 56 into the path 90 (see the flange 50B in FIG. 3). In other configurations, the path 90 may extend radially relative to the central axis 42, and the flange 50A may extend transverse relative to one of the first distal edge 54 and the second distal edge 56 into the path 90 (see the flange 50A in FIG. 3). In yet other configurations, the path 90 may extend both axially and radially (see FIG. 8) relative to the central axis 42, and the flange 50C extends both axially and radially from one of the first distal edge 54 and the second distal edge 56 into the path 90 (see the flanges 50C in FIG. 5). The housing 18 may be configured as discussed above with the suitable number of paths 90 depending on the number of flanges 50A, 50B, 50C being used. It is to be appreciated that if the plurality of flanges 50A, 50B, 50C are being used, the housing 18 may define a plurality of paths 90, and each of the paths 90 may be in any of the configurations discussed above for the path 90.

In certain configurations, as mentioned above, the component 38 may include the bearing 46 disposed in the hole 40 (see FIGS. 2 and 7). More specifically, the side 78A of the bearing 46 may face the recess 82. For example, the bearing 46 may be used to reduce friction between the shaft 47 (which may include the output shaft 20, the input member 22 or the output member 28, etc.) that rotates and a stationary component 38, such as the housing 18. Furthermore, the bearing 46 may support the shaft 47 that rotates. The ring 44 is disposed radially between the bearing 46 and the housing 18 relative to the central axis 42. Therefore, due to the location of the ring 44 being radially between the bearing 46 and the housing 18, the ring 44 attenuates the sound that travels radially from the bearing 46 out toward the housing 18. The ring 44 may be referred to as a radial ring.

As best shown in FIG. 8, the bearing 46 may include the first race 92 fixed to the housing 18 and a second race 94 rotatable relative to the first race 92 about the central axis 42, with one or more ball bearings 93 disposed between the first and second races 92, 94. The second race 94 may be disposed closer to the central axis 42 than the first race 92 is relative to the central axis 42. The first race 92 may include the side 78A that faces the recess 82. Generally, the body 52 of the ring 44 may be disposed between the first race 92 and the housing 18. Furthermore, the body 52 of the ring 44 may abut the first race 92. When utilizing the flange 50C that is bent around the first race 92 as shown in FIG. 8, the axial portion 76 of the flange 50 may abut the first race 92 along a side portion 96 of the bearing 46. It is to be appreciated that a length L of the axial portion 76 of the flange 50C in FIG. 8 is for illustrative purposes only, and the length L of the axial portion 76 may be longer or shorter than illustrated. It is to also be appreciated that the length L of the axial portion 76 does not extend beyond the first race 92 relative to the second race 94. That is, the length L of the axial portion 76 does not extend to the rotating part of the bearing 46, i.e., does not extend to the second race 94. The bearing 46 may be a ball-bearing, a cylindrical bearing, a roller bearing, or any other suitable bearing that uses races.

Figure 10:
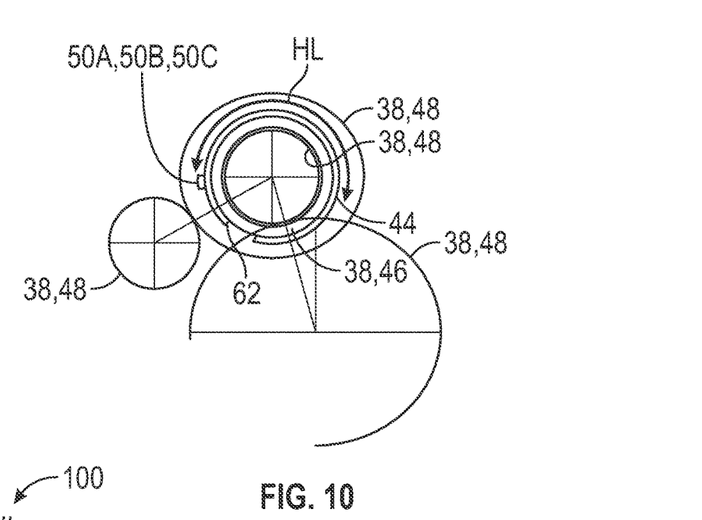
FIG. 10 is a schematic illustration of a high-load area relative to the ring.

As discussed above, the component 38 may include the shaft 47, and the bearing 46 supports rotation of the shaft 47. Therefore, for example, rotation of the shaft 47 (which may include the output shaft 20, the input member 22 or the output member 28, etc.) creates the high-load area HL, $HL_1$, $HL_2$ on the bearing 46. That is, torque Ts produced due to rotation of the shaft 47 creates the high-load area HL, $HL_1$, $HL_2$ that is transferred to the bearing 46. The first shoulder 86 and the second shoulder 88 of the housing 18 support higher torques, such as torque Ts, produced via rotation of the shaft 47. Referring to FIG. 10, in certain configurations, one high-load area HL is created on the bearing 46. The body 52 of the ring 44 is positioned along the high-load area HL, $HL_1$, $HL_2$ to maximize attenuation of the sound in response to operation of the shaft 47. Therefore, the opening 62 of the ring 44 is spaced from the high-load area HL, $HL_1$, $HL_2$. That is, the opening 62 of the ring 44 does not attenuate the sound so it is desirable to position the opening 62 away from the high-load area HL, $HL_1$, $HL_2$ which produces or generates the sound to be attenuated. Generally, the high-load area HL, $HL_1$, $HL_2$ may create a force F equal to or greater than 5 kilonewton (kN). More specifically, as one non-limiting example, the force F created in the high-load area HL, $HL_1$, $HL_2$ may be about 5 kN to about 30 kN.

The ring 44 may be tuned to a desired frequency to attenuate the sound produced along the high-load area HL, $HL_1$, $HL_2$. For example, the ring 44 may be formed with a stiffness Ks (see FIG. 9) that is designed to attenuate the sound along the high-load area HL, $HL_1$, $HL_2$. Generally, the stiffness Ks of the ring 44 is the extent to which the body 52 of the ring 44 resists deformation in response to the force F from the high-load area HL, $HL_1$, $HL_2$ being applied thereto. Therefore, the stiffer the body 52 of the ring 44 is the less the body 52 will deform in response to the force, and vice versa. As such, the body 52 will vibrate at different rates depending on the stiffness Ks, and thus, the frequency of the ring 44 may be tuned to the desired frequency to attenuate the sound produced during operation of the component 38. Hence, the frequency of the ring 44 cancels the frequency of the component 38 to attenuate the sound that radiates out of the housing 18. Generally, reducing the stiffness Ks radially and axially may assist in reducing the sound heard outside of the housing 18.

Optionally, the ring 44 may be designed to attenuate a plurality of frequencies of the sound. Therefore, the ring 44 may have different areas being of different stiffnesses $K_{s1}$, $K_{s2}$. For example, referring to FIG. 3, the body 52 of the ring 44 may include a first portion 98 that provides a first-ring stiffness $K_{s1}$ and a second portion 100 that provides a second-ring stiffness $K_{s2}$ different from the first-ring stiffness $K_{s1}$. For example, referring to FIG. 11, rotation of the shaft 47 creates a first-high-load area $HL_1$, on the bearing 46 when in a first condition and creates a second-high-load area $HL_2$ on the bearing 46 when in a second condition. The first-high-load area $HL_1$ is different from the second-high-load area $HL_2$. The first portion 98 of the body 52 that has the first-ring stiffness $K_{s1}$ aligns with the first-high-load area $HL_1$ to maximize attenuation of the sound in the first-high-load area $HL_1$ and the second portion 100 of the body 52 that has the second-ring stiffness $K_{s2}$ aligns with the second-high-load area $HL_2$ to maximize attenuation of the sound in the second-high-load area $HL_2$. It is to be appreciated that the ring 44 may be designed with any suitable number of portions 98, 100 having different stiffnesses. It is to also be appreciated that the ring 44 illustrated in FIG. 5 may have the different stiffness portions 98, 100 as illustrated in FIG. 3, and FIG. 3 may not have the different stiffness portions 98, 100.

Figure 11:
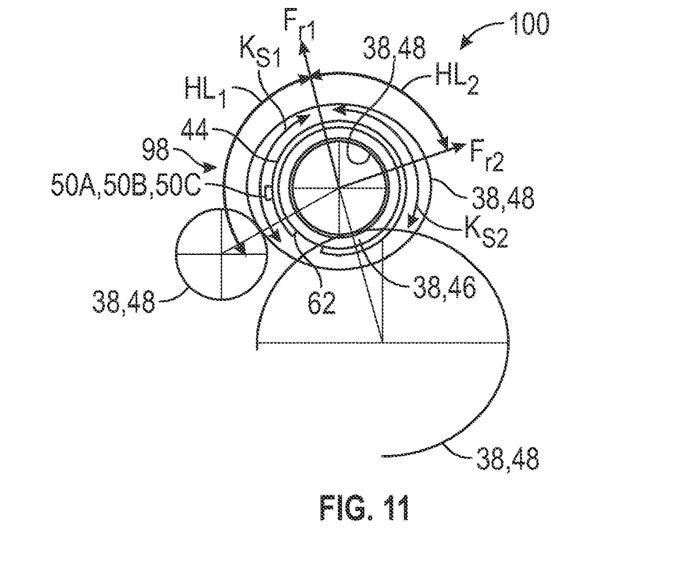
FIG. 11 is a schematic illustration of two high-load areas relative to the ring.

For example, referring to FIG. 11, if the ring 44 is being used in the transmission 16, a first resulting force Fri in a first direction is different from a second resulting force $F_{r2}$ in a second direction due to operation of the transmission 16 in the first condition and the second condition. The first resulting force Fri in the first direction creates the first-high-load area $HL_1$ that is different from the second resulting force $F_{r2}$ in the second direction. The first condition may be when the transmission 16 operates in a drive mode in which the movable platform 12 is being propelled, and the second condition may be when the transmission 16 operates in a regenerative braking mode in which energy is recovered during braking of the movable platform 12 that may be used immediately or stored in an energy storage device for later use. Any change in the load direction may allow for a new stiffness over the corresponding reaction arc, and thus, the ring 44 may be designed with the different stiffnesses $K_{s1}$, $K_{s2}$. Changing the output torque direction, such as drive to coast or regenerative braking, may change the load direction that allows for a new stiffness over the corresponding reaction arc. Also, if multiple prime movers 14 interact with the output shaft 20 (e.g., such as a hybrid vehicle where torque from the engine on one gear and torque from the electric motor also being transmitted through the same output shaft 20 by a different gear which may be at different uncorrelated levels of torque), then the ring 44 may be designed with different stiffnesses $K_{s1}$, $K_{s2}$.

The present disclosure also provides a method of utilizing the ring 44 to attenuate the sound in response to operation of the component 38 inside of the housing 18. Parameters of the ring 44 are determined and then the ring 44 is formed to those parameters. For example, the torque Ts is selected that is applied to the ring 44. The torque Ts is a given value based on the torque applied to the component 38. For example, the torque Ts from rotation of the shaft 47 is applied to the bearing 46 as the force F and ultimately as the force F to the ring 44.

Figure 9:
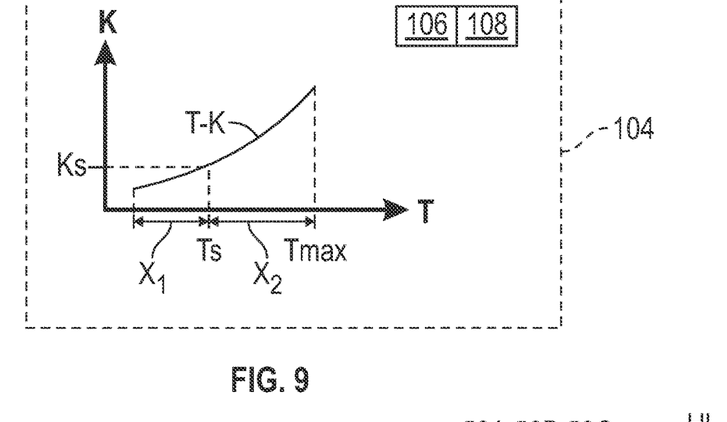
FIG. 9 is a schematic illustration of a controller that includes data regarding a torque-stiffness curve.

The stiffness Ks of the ring 44 is determined based on a torque-stiffness curve T-K (see FIG. 9) which utilizes the selected torque Ts to maximize attenuation of the sound in response to operation of the component 38. That is, to attenuate the sound, the ring 44 needs to be designed with the desired stiffness Ks. The graph of FIG. 9 illustrates the torque-stiffness curve T-K, where the y-axis provides the values for the stiffness K and the x-axis provides the values of the torque T. Therefore, the stiffness Ks of the ring 44 may be found by identifying the value of the torque Ts on the torque-stiffness curve T-K. At the intersection point 80 on the torque-stiffness curve T-K, the value of the stiffness Ks is found. Continuing with the graph of FIG. 9, a first range $X_1$ of the torque T suitable for the ring 44 is at the selected torque Ts or below the selected torque Ts. Based on these values, the ring 44 is manufactured that meets the determined stiffness Ks.

The torque-stiffness curve T-K is developed via a system analysis to satisfy misalignment and deflection requirements of the ring 44. Satisfying the allowable limits of misalignment impacts gear tooth contact from deflection under load and clearances. The ring 44 may be designed utilizing a finite element method (FEM), which subdivides a large system into smaller simpler pieces that are the finite elements. For example, one or more simple equations are used to model the finite elements which are then assembled into a larger system of equations that are used to ultimately model the result for the torque-stiffness curve T-K, which may be referred to as finite element analysis (FEA).

The transmission 16 may include various gears 48 coupled to the shaft 47, and thus as discussed above, the component 38 may include the gears 48. The gears 48 may be used to change operation modes of the transmission 16 or the torque being outputted to the wheels 34 via changing a gear ratio of certain gears 48. A profile 102 of the gears 48 (see FIG. 7) may also be used to tune the ring 44 to desired stiffness Ks. The profile 102 of the component 38, here one or more gears 48, is/are manufactured at a second range $X_2$ of the torque T (see the graph of FIG. 9) that is higher than the selected torque Ts applied to the ring 44. Therefore, the profile 102 of the gear(s) 48 is designed to have a torque T above the torque Ts of the ring 44 and no greater than a maximum torque Tmax, i.e., within the second range $X_2$ (see the graph of FIG. 9). For example, to optimize the profile 102 of the gear(s) 48, system modeling and noise-vibration-harshness (NVH) modeling may be used. System modeling comprehends the gear 48 as a source and the response of the housing 18. NVH modeling may be used to study and modify sound characteristics, such as noise and vibration characteristics, of the component 38 during operation, such as movement or rotation of the component 38. For example, when the component 38 is the gear 48, the system modeling and the NVH modeling may be used to optimize the profile 102 of the gear 48 for the torque T with the bearing 46 supported via the housing 18.

Therefore, a controller 104 (see FIG. 9) may be utilized to perform the FEM, which includes the FEA, the system modeling, and the NVH modeling. Instructions may be stored in a memory 106 of the controller 104 and automatically executed via a processor 108 of the controller 104 to provide the respective control functionality and modeling functionality. The controller 104 is configured to execute the instructions from the memory 106, via the processor 108. For example, the controller 104 may be a host machine or distributed system, e.g., a computer such as a digital computer or microcomputer, and, as the memory 106, tangible, non-transitory computer-readable memory such as read-only memory (ROM) or flash memory. The controller 104 may also have random access memory (RAM), electrically erasable programmable read-only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 104 may include all software, hardware, memory 106, algorithms, connections, sensors, etc., necessary to control, formulate, and/or models, for example, the data for the ring 44 and the component 38. As such, a control method to formulate the design of the ring 44 and the component 38, may be embodied as software or firmware associated with the controller 104. Optionally, more than one controller 104 may be utilized.

The ring 44 may be manufactured with one or more of the features discussed above, such as the corrugations 64, 72, etc., and will not be repeated. After the ring 44 is manufactured with the desired stiffness Ks and orientation of the flange 50A, 50B, 50C, the ring 44 is disposed radially between the component 38 and the housing 18 to attenuate the sound in response to operation of the component 38. For example, in certain configurations, the body 52 may be disposed in the recess 82 of the housing 18 before placing the bearing 46 relative to the housing 18. The ring 44 may be compressed or squeezed due to the non-continuous configuration of the body 52, which shrinks the outer diameter of the ring 44 and allows the ring 44 to be inserted into the hole 40 of the housing 18 and align with the recess 82. The flange 50A, 50B, 50C of the ring 44 is disposed in the path 90 of the housing 18 and once the body 52 is aligned with the recess 82, the ring 44 is released to seat the body 52 within the recess 82 and at least partially un-compress the ring 44. After the ring 44 is positioned in the recess 82 of the housing 18, the component 38, such as the bearing 46, may be press fit to the housing 18 within the hole 40 of the housing 18 until the desired compression load is applied to the ring 44.

It is to be appreciated that the order or sequence of performing the method is for illustrative purposes and other orders or sequences are within the scope of the present teachings.

While the best modes and other configurations for carrying out the disclosure have been described in detail, those familiar with the art to which this disclosure relates will recognize various alternative designs and configurations for practicing the disclosure within the scope of the appended claims. Furthermore, the configurations shown in the drawings or the characteristics of various configurations mentioned in the present description are not necessarily to be understood as configurations independent of each other. Rather, it is possible that each of the characteristics described in one of the examples of an configuration can be combined with one or a plurality of other desired characteristics from other configurations, resulting in other configurations not described in words or by reference to the drawings. Accordingly, such other configurations fall within the framework of the scope of the appended claims.

What is claimed is:

1. A sound reduction assembly comprising:
a housing;
a component supported via the housing and movable relative to the housing;
a ring coupled to the component and the housing, and wherein the ring is configured to attenuate sound inducing vibrations in response to operation of the component;
wherein the ring includes a flange fixed relative to the housing to maintain a position of the ring relative to the component which maximizes attenuation of the sound in response to operation of the component;
wherein the ring includes a body that extends to a first distal edge and a second distal edge that oppose each other; and
wherein the flange protrudes from one of the first distal edge and the second distal edge.

2. The sound reduction assembly as set forth in claim 1 wherein:
the component is rotatable about a central axis which creates a high-load area on the component; and
the flange maintains the position of the body of the ring along the high-load area to maximize attenuation of the sound in response to operation of the component.

3. The sound reduction assembly as set forth in claim 2 wherein the ring surrounds the central axis and the body of the ring extends axially relative to the central axis.

4. The sound reduction assembly as set forth in claim 1 wherein the flange is disposed transverse to one of the first distal edge and the second distal edge.

5. The sound reduction assembly as set forth in claim 4 wherein:
the component is rotatable about a central axis and the ring surrounds the central axis; and
the flange is disposed transverse to the first distal edge and extends toward the central axis such that part of the flange overlaps part of the component.

6. The sound reduction assembly as set forth in claim 1 wherein:
the component is rotatable about a central axis and the ring surrounds the central axis; and
the flange is disposed axially from one of the first distal edge and the second distal edge relative to the central axis.

7. The sound reduction assembly as set forth in claim 1 wherein:
the body of the ring includes a plurality of first corrugations disposed between the first distal edge and the second distal edge; and
the flange includes a second corrugation.

8. The sound reduction assembly as set forth in claim 1 wherein:
the housing defines a hole along a central axis;
the component includes a bearing disposed in the hole; and
the ring is disposed radially between the bearing and the housing relative to the central axis.

9. The sound reduction assembly as set forth in claim 8 wherein:
the bearing includes a first race fixed to the housing and a second race rotatable relative to the first race about the central axis; and
the body of the ring is disposed between the first race and the housing.

10. The sound reduction assembly as set forth in claim 9 wherein:
the housing defines a recess that connects to the hole such that the recess is open to the hole and faces the central axis; and
the body of the ring is disposed in the recess.

11. The sound reduction assembly as set forth in claim 10 wherein the housing defines a path that connects to the recess and the flange is disposed in the path to fix the position of the body of the ring relative to the housing and the first race.

12. The sound reduction assembly as set forth in claim 11 wherein:
the path extends axially relative to the central axis; and
the flange extends axially relative to one of the first distal edge and the second distal edge into the path.

13. The sound reduction assembly as set forth in claim 11 wherein:
the path extends both axially and radially relative to the central axis; and
the flange extends both axially and radially from one of the first distal edge and the second distal edge into the path.

14. The sound reduction assembly as set forth in claim 1 wherein:
the component includes a shaft and a bearing that supports rotation of the shaft and rotation of the shaft creates a high-load area on the bearing; and
the body of the ring is positioned along the high-load area to maximize attenuation of the sound in response to operation of the shaft.

15. The sound reduction assembly as set forth in claim 14 wherein:
the body of the ring includes a first end and a second end spaced from each other to define an opening therebetween such that the body of the ring is non-contiguous; and
the opening is spaced from the high-load area.

16. The sound reduction assembly as set forth in claim 15 wherein:
the body of the ring includes a first portion that provides a first-ring stiffness and a second portion that provides a second-ring stiffness different from the first-ring stiffness;
rotation of the shaft creates a first-high-load area on the bearing when in a first condition and creates a second-high-load area on the bearing when in a second condition;
the first-high-load area is different from the second-high-load area; and
the first portion of the body that has the first-ring stiffness aligns with the first-high-load area to maximize attenuation of the sound in the first-high-load area and the second portion of the body that has the second-ring stiffness aligns with the second-high-load area to maximize attenuation of the sound in the second-high-load area.

17. The sound reduction assembly as set forth in claim 1 wherein:
the flange is further defined as a plurality of flanges spaced from each other;
each of the flanges protrude from one of the first distal edge and the second distal edge; and
each of the flanges are fixed relative to the housing to maintain a position of the body relative to the housing.

18. A ring coupled to a component and a housing, and wherein the ring is configured to attenuate sound inducing vibrations in response to operation of the component; the ring comprising:

a body that extends to a first distal edge and a second distal edge that oppose each other;

wherein the ring includes a flange that protrudes outwardly from one of the first distal edge and the second distal edge;

wherein the body of the ring includes a plurality of first corrugations disposed between the first distal edge and the second distal edge; and wherein the flange includes a second corrugation; and wherein the flange is fixed relative to the housing to maintain a position of the body of the ring relative to the component.

19. A method of utilizing a ring to attenuate sound inducing vibrations in response to operation of a component inside of a housing, the method comprising:

selecting a torque applied to the ring;

determining a stiffness of the ring based on a stiffness-torque curve utilizing the selected torque to maximize attenuation of the sound in response to operation of the component;

manufacturing the ring that meets the determined stiffness;

manufacturing a profile of the component at a torque range higher than the selected torque applied to the ring; and disposing the ring radially between the component and the housing to attenuate the sound in response to operation of the component.

* * * * *